US009964337B2

(12) United States Patent
Ponzio, Jr.

(10) Patent No.: US 9,964,337 B2
(45) Date of Patent: May 8, 2018

(54) PROGRESSIVE AIR TEMPERATURE BOOSTER POWERED BY THE SUN

(71) Applicant: Joseph Ponzio, Jr., Fanwood, NJ (US)

(72) Inventor: Joseph Ponzio, Jr., Fanwood, NJ (US)

(*) Notice: Subject to any disclaimer, the term of this patent is extended or adjusted under 35 U.S.C. 154(b) by 408 days.

(21) Appl. No.: 14/714,332

(22) Filed: May 17, 2015

(65) Prior Publication Data
US 2016/0336898 A1    Nov. 17, 2016

(51) Int. Cl.
F24J 2/44      (2006.01)
H02S 40/44     (2014.01)

(52) U.S. Cl.
CPC .............. F24J 2/44 (2013.01); H02S 40/44 (2014.12); Y02E 10/40 (2013.01); Y02E 10/60 (2013.01)

(58) Field of Classification Search
CPC ......... F24J 2/44; H02S 40/44; F24D 2200/14; F24D 11/003; F24D 3/08; F24D 5/005; F24D 2200/02; F24D 11/007; F28D 15/0266; F28D 15/0275; F28D 15/02; F28D 15/0233; F28D 15/06; F28D 15/00; F28D 20/021; F28D 15/04; F28D 2021/0021; F28D 2021/0029; F28D 20/0039; F28D 20/02; F28D 7/1669; F28D 15/0208
See application file for complete search history.

(56) References Cited

U.S. PATENT DOCUMENTS

| | | | | | |
|---|---|---|---|---|---|
| 4,128,124 | A | * | 12/1978 | Worthington | F24D 11/003 126/616 |
| 4,281,639 | A | * | 8/1981 | Kuronen | F24D 11/007 126/617 |
| 2006/0219237 | A1 | * | 10/2006 | Bowen | F24J 2/242 126/638 |
| 2011/0209742 | A1 | * | 9/2011 | Narayanamurthy | F24D 11/003 136/246 |
| 2011/0257795 | A1 | * | 10/2011 | Narayanamurthy | F24F 5/0046 700/277 |
| 2014/0224302 | A1 | * | 8/2014 | Keenihan | H01L 31/0521 136/246 |

* cited by examiner

Primary Examiner — Jason Lau

(57) ABSTRACT

A closed loop fluid thermosiphon that uses solar energy to progressively boost the air temperature passing through it and comprises a heat sink segment capable of absorbing energy from the sun and a heat exchange segment that transfers energy to the air passing through the heat exchange and progressively boosts the air's temperature that is capable of being either used independently with other passive solar elements, as part of a solar energy system, or in combination with active solar elements, as part of a hybrid solar energy system.

20 Claims, 5 Drawing Sheets

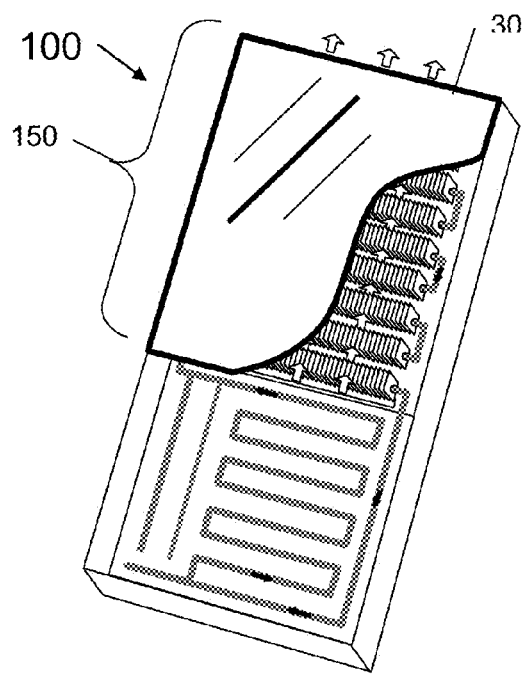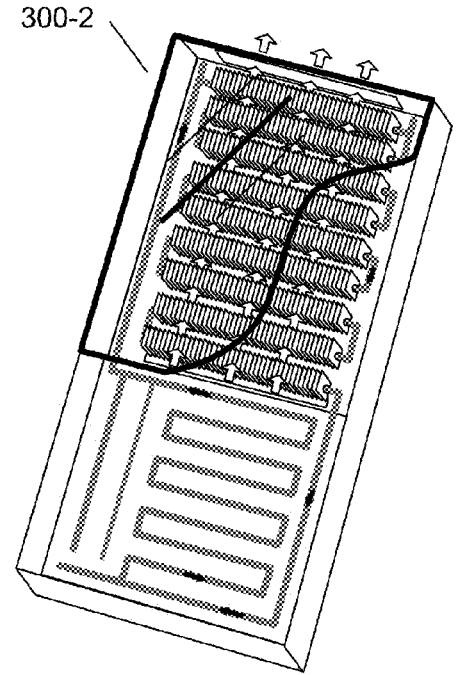
Fig 3A  Fig 3B
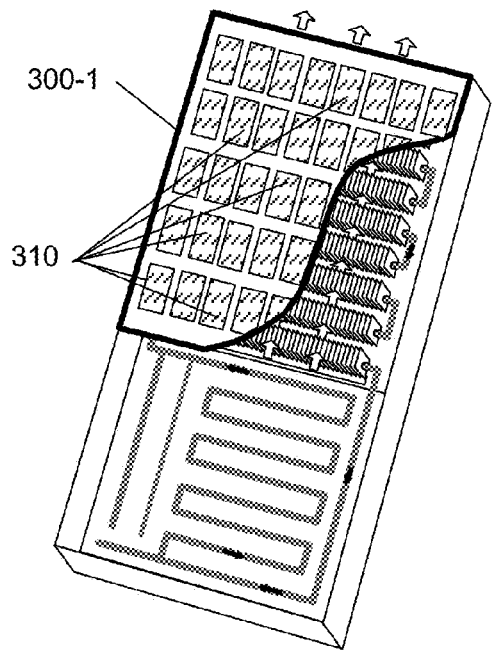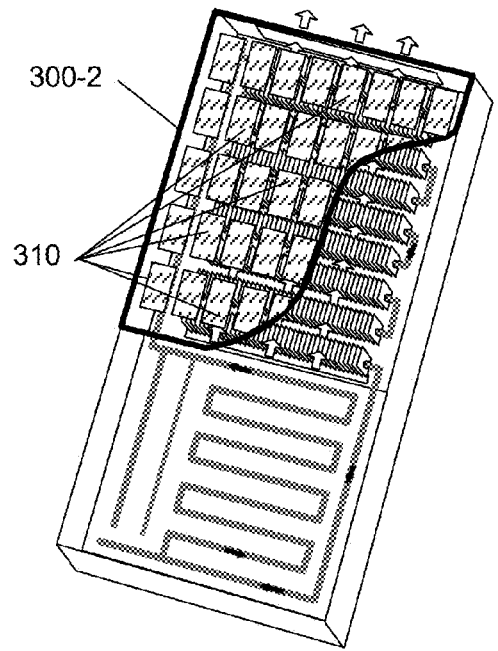
Fig 3C  Fig 3D

PROGRESSIVE AIR TEMPERATURE BOOSTER POWERED BY THE SUN

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to solar energy systems.

BACKGROUND

Solar energy systems capture the radiant light and heat from the sun using a range of ever-evolving technologies such as solar heating, solar photovoltaics, solar thermal energy, solar architecture and most recently artificial photosynthesis.

Solar energy systems are an important source of renewable energy and its technologies are broadly characterized as either passive or active depending on the way they capture and distribute the solar energy or convert it into solar power. Active solar techniques include the use of photovoltaic systems, concentrated solar power and solar water heating to harness the energy. Passive solar techniques include orienting a building to the Sun, selecting materials with favorable thermal or light dispersing properties, and designing spaces that naturally circulate air. A hybrid system is one that combines both passive and active elements together into a single system.

One passive solar technique that is particularly useful are systems called, thermosiphons. A thermosiphon is a physical effect and refers to a method of passive heat exchange based on natural convection, in which a fluid circulates without the necessity of a mechanical pump. Thermosiphoning is used for circulation of liquids and volatile gases in heating and cooling applications, such as heat pumps, water heaters, boilers and furnaces. Thermosiphoning also occurs across air temperature gradients such as those utilized in a wood fire chimney, or solar chimney. However, a thermosiphon system for efficiently heating air up to a temperature that can be used for domestic hot water, as well as heating structures, has yet to be realized. Instead, air based thermosiphons are typically only for heating the air in buildings/structures and thermosiphons that heat water are used for domestic hot water.

It should be noted that thermosiphons can either be open-loop, such as when the substance in a holding tank is passed in one direction via a heated transfer tube mounted at the bottom of the tank to a distribution point or closed-loop circuits with return to the original container.

With respect to active systems, their use has increased dramatically over the past few decades and photovoltaic panels are now on roofs everywhere.

Unfortunately, the photovoltaic (PV) cells have not seen much of an increase in how efficiently they convert sunlight to electricity. Flat plate collectors use the same method for capturing thermal energy as originally designed many decades ago and the same is true for evacuated tube collectors as well.

One of the problems is that PV cells loose efficiency as the temperature of the panel increases.

For example, typical PV modules convert around 85% of incoming sunlight into heat. During peak conditions, this can result in a heat-generation of 850 W/m$^2$ and PV module temperatures as high as 70° C. The electrical power produced by PV modules decreases linearly with increase in module temperature. For example, in bright sunlight, crystalline silicon PV modules may heat up to 20-30° C. above ambient temperature, resulting in a 10-15% reduction in power output relative to the rated power output for the PV module. Moreover, higher PV module temperatures may increase material degradation, such as thermal fatigue failure of interconnections between PV cells in the PV module.

The problem is that if the PV cells are cooled to a temperature of about 40° C. (104° F.), which is the point at which the efficiency really begins to drop, that the coolant medium used (air or liquid) does not have sufficient energy, by itself, to sufficiently heat a domestic hot water system.

Therefore, there continues to be a need for efficient ways boost the temperature of air that are either independent of other solar systems or part of a hybrid system.

SUMMARY

In order to overcome the deficiencies in the prior art, systems and methods are described herein.

One aspect of the claimed invention involves a closed loop fluid (either liquid, gas, or both) thermosiphon that uses solar energy to progressively boost the air temperature passing through it and comprises a heat sink segment capable of absorbing energy from the sun and a heat exchange segment that transfers energy to the air passing through the heat exchange and progressively boosts the air's temperature.

This aspect and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

BRIEF DESCRIPTION OF THE DRAWINGS

FIGS. 3A-D, show in simplified form, various covers for the heat exchange segment;

DETAILED DESCRIPTION

The instant devices and approach provide a way to efficiently capture solar energy to progressively boost the temperature of air that can be used either independently or as part of a hybrid solar system. The instant devices and approach is a closed loop fluid (either liquid, gas, or both) thermosiphon that uses solar energy to progressive boost the air temperature passing through it and comprises a heat sink segment capable of absorbing energy from the sun and a heat exchange segment that transfers energy to the air passing through the heat exchange segment and progressively boosts the air's temperature.

Figure 1:
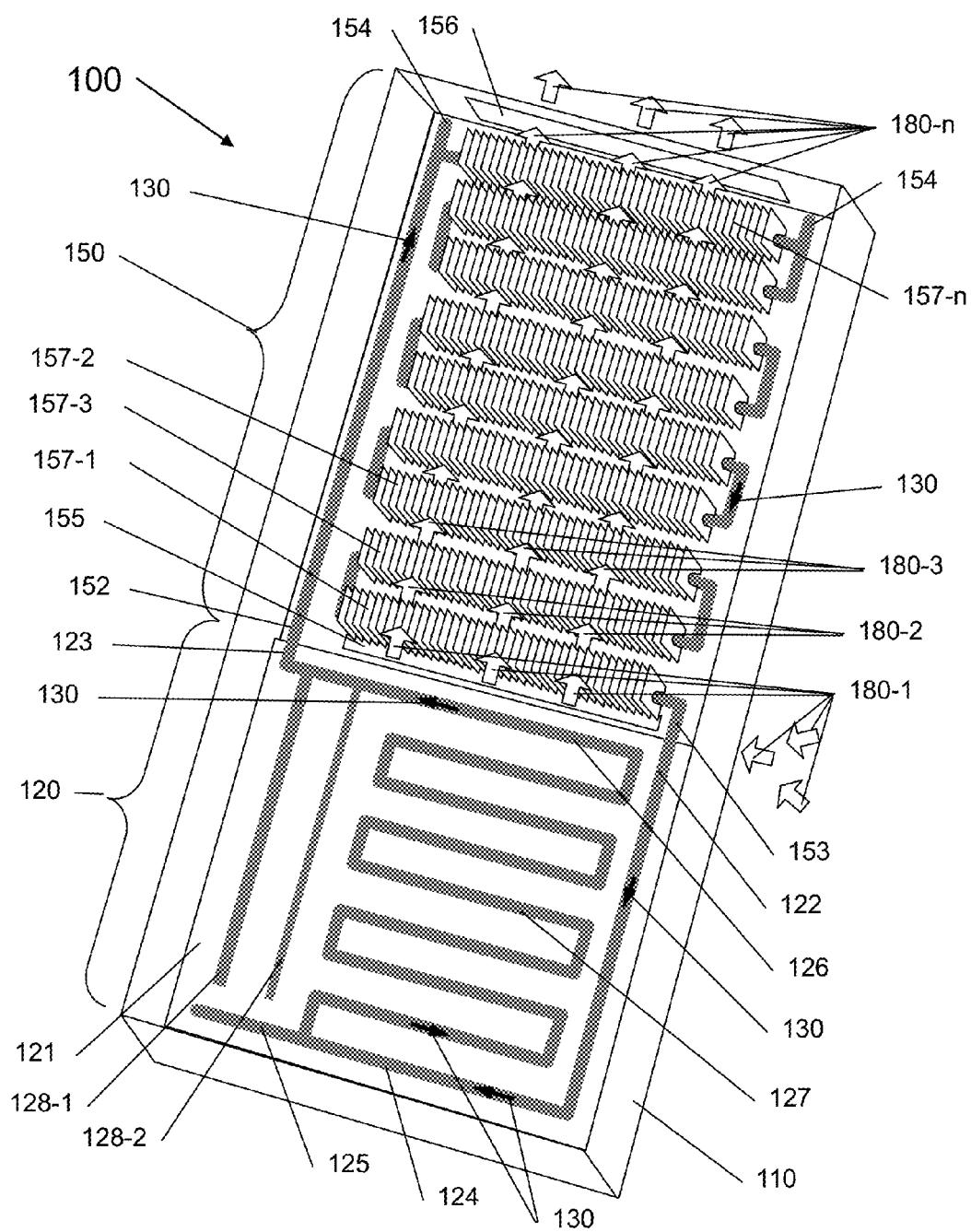
FIG. 1 is a simplified in simplified form, a segmented closed loop thermosiphon system.

FIG. 1 shows, in simplified form, a segmented closed loop thermosiphon system 100, as a solar panel element.

The thermosiphon system 100 is within an enclosure 110, which is configured to be suitable for attachment to a roof or to be part of a group of other solar panel elements that are inserted into a frame.

The thermosiphon system 100 has at least two segments: a heat sink segment 120, capable of absorbing energy from the sun, and a heat exchange segment 150 configured to progressively heat the air passing through it, which will now both be described.

The heat sink segment 120 is comprised of heat sink 121, which is capable of absorbing heat from the sun and is typically made up of a large mass of conductive material (e.g. aluminum or copper) that is often anodized black in order to increase its ability to absorb solar energy. Other options include fluid baths and even biomass capable of absorbing solar energy and transmitting energy to the thermosiphon. The point being not the particular type of heat sink utilized but that the heat sink segment is capable of absorbing solar energy and transmitting it to the thermosiphon running through the heat sink segment 120.

Figure 2:
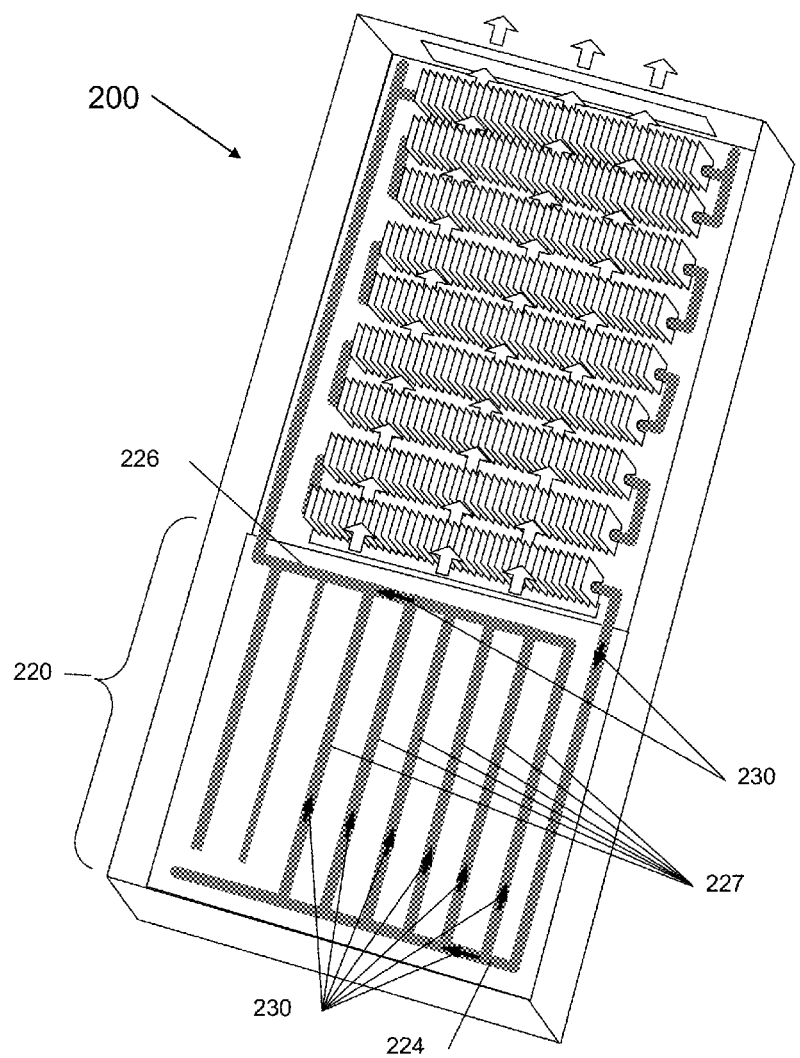
FIG. 2 shows, in simplified form, a segmented closed loop thermosiphon system with multiple heat exchange pathways.

The thermosiphon running through the heat sink segment 120 is comprised of a fluid inflow 122, a fluid outflow 123, a footer 124, a header 126 and one or more heat exchange pathways 127 (Note: FIG. 2 shows multiple exchange pathways) connecting the footer 124 to the header 126.

Continuing with FIG. 1, the heat sink 121 and the one or more heat exchange pathways 127 are configured such that the heat is transferred from the heat sink to the fluid 130 inside the thermosiphon. Ideally the heat sink 121 and the one or more heat exchange pathways 127 are conductively bonded together using some type of conductive substance such as a conductive adhesive, conductive solder, or welded together. Other alternatives include the use of an aluminum or other conductive sheet that is formed over the one or more heat exchange pathways 127 and attached to the heat sink and thereby maintains a physical connection to the one or more heat exchange pathways 127. Alternatively, if the heat sink 121 is a fluid bath or a biomass then the one or more heat exchange pathways 127 may run directly through the heat exchanger or otherwise be a fully integrated component of the heat sink, such as fluid paths drilled directly through an aluminum plate.

In still other versions the heat sink segment 120 is sealed and preferably evacuated and forms a heat chamber and the heat stored in the heat sink 121 is transmitted either through a physical connection, as previously described, or through the air in the heat chamber.

In still other version concentrators or other forms of focusing the energy onto the either the heat sink 121 or one or more of the footer 124, the header 126, or the one or more heat exchange pathways 127. Illustrative examples of concentrators include mirrors and other reflective surfaces, Fresnel lens, prisms, and even holographic lens. The concentrators may either be fixed or track the sun in order to insure that the maximum solar energy converted.

The point being not the particular manner in which heat from the heat sink 121 is transferred to the one or more heat exchange pathways 127 and then subsequently to the fluid 130 inside the thermosiphon but that, as a system, they are configured to work together in order to heat the fluid 130 inside the thermosiphon.

The fluid 130, is symbolically represented as black arrows and with the arrows indicating the direction of flow within the thermo siphon. The fluid can be either a liquid (such as antifreeze, Freon . . . etc.) of a gas (E.g. air, hydrogen hydrocarbons, methane . . . etc.), which may also be evacuated or otherwise pressurized inside the thermosiphon. Additionally, depending on the pressurization of the fluid 130 (and the amount of heat transmitted to the fluid 130) the fluid 130 may undergo a phase transition from a liquid to a gas such that it enters through the fluid inflow 122 as a liquid and exits the fluid outflow 123 as a gas. Additionally, due to expansion of the fluid 130 when heated, the thermosiphon may include one or more expansion zones, 125, which may include one or more ports (not show) for the purposes of one or more of filling, pressurizing/evacuating the system and/or removing air pockets from the system.

Optionally, the system may include one or more auxiliary temperature boosters 128-1,128-2. Theses auxiliary temperature boosters 128-1,128-2 may be simply fluid filled pipes that are connected to the fluid 130 path or more complex systems such as heat pipes, that are configured to transmit energy to the header 126, which then transmits it to the fluid 130. [Note: a heat pipe is also a thermosiphon where a liquid in contact with a thermally conductive solid surface turns into a vapor by absorbing heat from that surface. The vapor then travels along the heat pipe to the cold interface, which in this case would be the header 123, and condenses back into a liquid—releasing the latent heat.]

Having just described the elements comprising the heat sink segment 120, the heat exchange segment 150 will now be described.

The heat exchange segment 150 is configured to transmit the energy from the thermosiphon to the air 180-1, 180-2, 180-3, . . . 180-$n$ passing through it.

The fluid 130 enters the heat exchange segment 150 through a fluid intake 152, passes through one or more heat transfer elements 157-1, 157-2, 157-3 . . . 157-$n$ and exits through a fluid outtake 153, and may have one or more expansion zones 154 located on the fluid 130 path. [Note: similar to the expansion zones 125 of the heat sink segment 120, the one or more expansion zones 154 of the heat exchange segment 150 may also include one or more ports (not show) for the purposes of one or more of filling, pressurizing/evacuating the system and/or removing air pockets from the system.

The air 180-1, 180-2, 180-3, . . . 180-$n$ passing through the heat exchange segment 150 enters through one or more air intakes 155 at one end of the heat exchanger and exits through a second end of the heat exchanger through one or more air outtakes 156. The air intake 155 is shown on the bottom of the heat exchange segment 150 and the of the air outtakes 156 is shown on the back end of heat exchange segment 150 but in alternate configurations the air intake 155 and/or the air outtake 156 can be located on one or more of the top, bottom, front, back and or side of the heat exchange segment 150. The importance being that the air 180-1, 180-2, 180-3, . . . 180-$n$ pass from one end of the heat exchange segment 150 to the other and not the location of the air intake 155 and the air outtake 155, which can vary by installation and even within a particular installation. The heat exchange segment also contains a cover (see FIG. 3A-D), which is configured to insure that the air 180-1, 180-2, 180-3, . . . 180-$n$ passing through the heat exchange segment 150 is directed through the one or more heat transfer elements 157-1, 157-2, 157-3 . . . 157-$n$.

Continuing with FIG. 1, as the air 180-1 enters through the air intake 155, it is initially heated by exchanging energy with heat transfer element 157-1. Exiting from heat transfer element 157-1 the air 180-2 is now warmer then when it entered, as it proceeds to heat transfer element 157-2 in order to exchange additional energy with the thermosiphon. Exiting from heat transfer element 157-2 the air 180-3 is now even warmer, as it is now heated by heat transfer element 157-3. Ultimately the air 180-$n$ exits from the final heat transfer element 157-$n$, where it has reached its maximum temperature before exiting through the one or more air outtakes 156.

As a result, the air 180-1, 180-2, 180-3, . . . 180-$n$ is progressively heated as it passes through the heat exchange segment 150 and exchanges energy with the one more heat transfer elements 157-1, 157-2, 157-3 . . . 157-$n$.

Similarly, due to cooling by exchanging energy with the air, the heat transfer elements 157-1, 157-2, 157-3 . . . 157-$n$ are progressively warmer as they progress from the heat transfer element 157-1 closest to the air intake 155 to the heat transfer element 157-$n$ that is closest to the air outtake 156, which is what drives the natural convection in the thermosiphon and causes the fluid 130 to circulate without the necessity of a mechanical pump.

The heat transfer elements 157-1, 157-2, 157-3 . . . 157-$n$ are shown as finned elements and can be made out of aluminum or other highly conductive material. Alternative approaches anticipated range from a simple radiant pipe with nothing attached to it to a mesh screen through which the air 180-1, 180-2, 180-3, . . . 180-$n$ flows. The point being not the particular configuration of the one or more heat transfer elements 157-1, 157-2, 157-3 . . . 157-$n$ but simply that they allow heat to be exchanged with the air 180-1, 180-2, 180-3, . . . 180-$n$ that flows through the heat exchange segment 150 and thereby creates the natural convection that causes the thermosiphon to circulate.

Having described the basic configuration, some additional alternate embodiments will now be presented.

FIG. 2 shows, in simplified form, a segmented closed loop thermosiphon system 200, which is similar to the segmented closed loop thermosiphon system 100 of FIG. 1, except that it has multiple heat exchange pathways 227. As such, the fluid 230 flow is capable of flowing from the footer 224 to the header 226 through each of the multiple heat exchange pathways 227.

FIGS. 3A-D, show in simplified form, various covers for the heat exchange segment 150 for the segmented closed loop thermosiphon system 100 of FIG. 1.

FIG. 3A shows an opaque (or semi-opaque) cover 300-1, which if made of a conductive material may also absorb solar energy and may transmit energy to the heat exchange segment 150.

FIG. 3B shows a transparent (or semi-transparent) cover 300-2, which can allow solar energy to pass directly into the heat exchange segment 150, whereby it may be absorbed.

FIG. 3C shows cover 300-1, with a plurality of photovoltaic cells 310 attached, whereby a hybrid system is created.

Similarly, FIG. 3D shows cover 300-2, with a plurality of photovoltaic cells 310 attached and any solar energy not absorbed by the photovoltaic cells 310 will pass through and enter the heat exchanger 150, whereby it may be absorbed.

Having described some of the embodiments, representative implementations will now be discussed as represented in FIGS. 4A-D, which show in simplified form, several representative implementations of the segmented closed loop thermosiphon 100 represented in FIG. 1, but are equally applicable to any of the embodiments described herein.

Figure 4A:
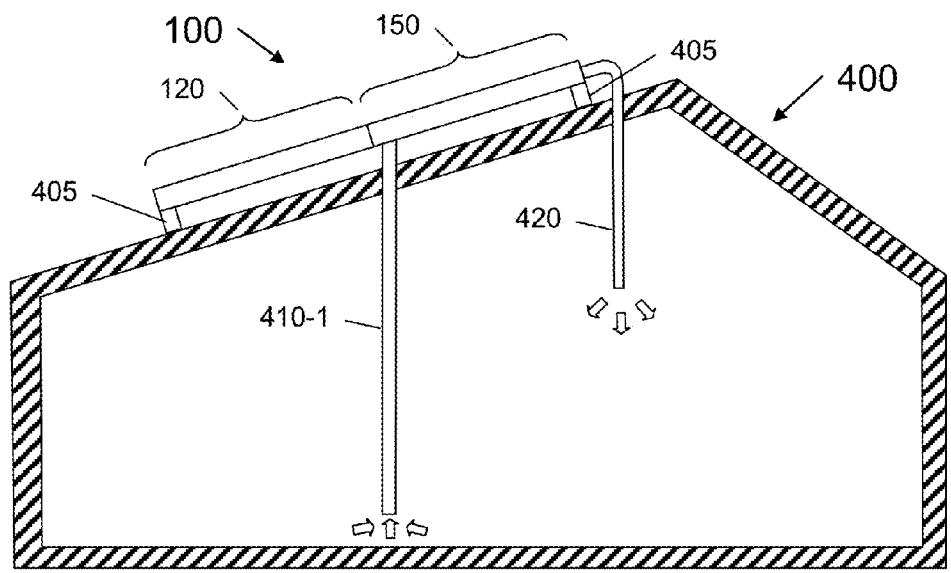
FIGS. 4A-D, show in simplified form, several representative implementations of the segmented closed loop thermosiphon.

FIG. 4A, shows in simplified form, the segmented closed loop thermosiphon 100 represented in FIG. 1 attached to a structure 400 and used to heat the structure 400. The closed loop thermosiphon 100 is attached to the structure 400 using one or more supports 405 but alternatively could be attached directly to the structure 400 or be inserted into a framework typically used for solar panel elements. Using an output duct 420 the heated air from the closed loop thermosiphon 100 is directed into the structure. In this particular case, the input for the closed loop thermosiphon 100 comes from inside the structure using an input duct 410-1 but it could also have come from ambient air outside the structure.

Figure 4B:
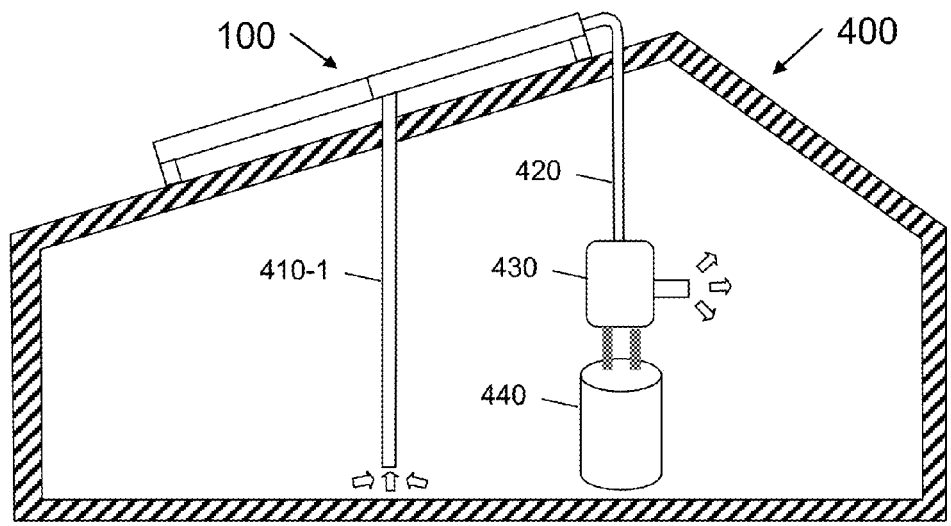

FIG. 4B, shows in simplified form, the segmented closed loop thermosiphon 100 represented in FIG. 1 attached to a structure 400 and used to heat a desired fluid prior to heating the structure 400. In this case, using the output duct 420, the heated air from the closed loop thermosiphon 100 is directed into a secondary heat exchanger 430 that transfers energy to a fluid of interest (e.g. a water heater 440 prior to being used to heat the structure.

Figure 4C:
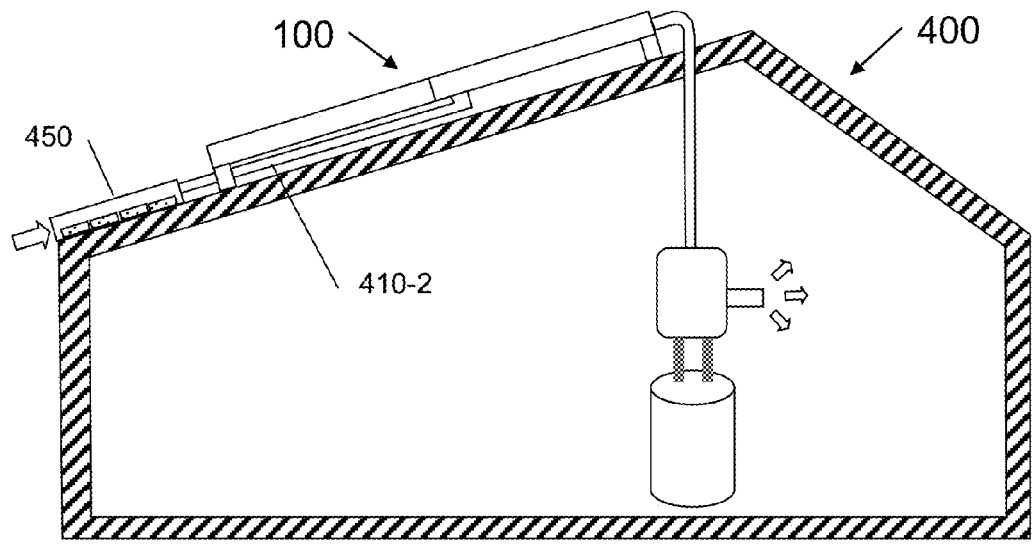

FIG. 4C, shows in simplified form, the segmented closed loop thermosiphon 100 represented in FIG. 1 utilized to boost the temperature of air flowing out of an air-cooled photovoltaic solar panel element 450. In this case, air flowing out of air-cooled photovoltaic solar panel element 450 is directed through an input duct 410-2 to the segmented closed loop thermosiphon 100.

Figure 4D:
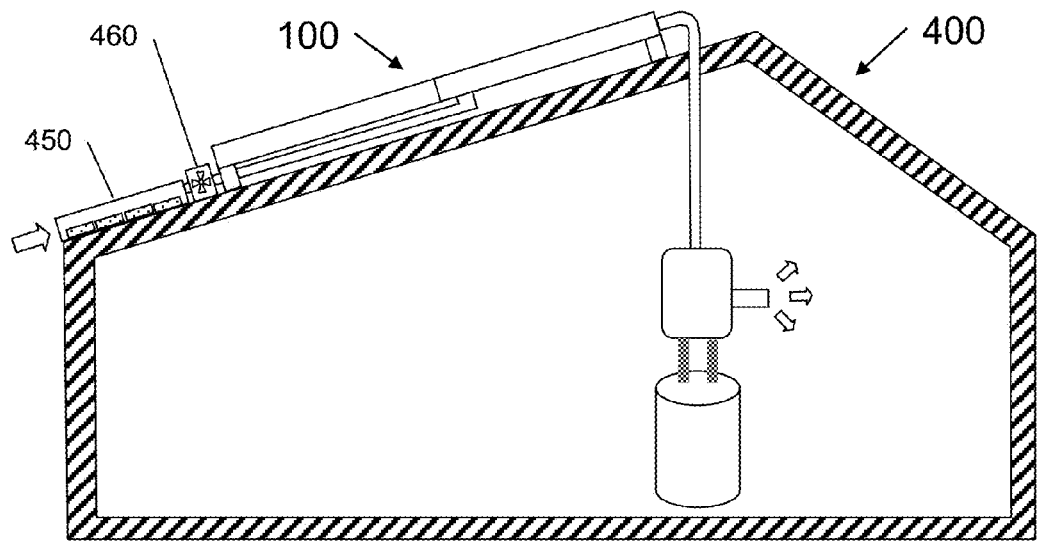

FIG. 4D, shows in simplified form, the addition of one or more temperature controlled air handlers 460 that is able to sense the output temperature of the air-cooled photovoltaic solar panel element 450 and increase or decrease the airflow as necessary in order to maintain a predetermined temperature/temperature range. The location of the one or more temperature controlled air handlers 460 can be anywhere in the path of the air flow from just after the air-cooled photovoltaic solar panel element 450, as shown, to anywhere along the air flow path (e.g. either before, a component of, or after the duct work 410-2, 420, the closed loop thermosiphon 100 and/or the secondary heat exchanger 430 and even be at the input to the air-cooled photovoltaic solar panel element 450, such that it pushes air through the system). Similarly, the temperature can be sensed at one or more locations along the path and need not be directly measured at the output of the air-cooled photovoltaic solar panel element 450 in order to maintain the temperature with the air-cooled photovoltaic solar panel element 450. It should be noted that for all the configurations specified, if the temperature of the heat sink element 120 is less than that of the air input then the segmented closed loop thermosiphon 100 will provide cooling of the air output rather than heating and will still function as a thermosiphon.

It should be noted that the hybrid systems represented in FIGS. 3C, 3D, 4C and 4D are exemplary combinations of hybrid systems. Other examples include use of the system with standard photovoltaic panels or liquid cooled panels rather than the air-cooled photovoltaic solar panel element 450 of FIGS. 4C and 4D, which could either be located above, below or beside the any of the embodiments presented. Additionally, any of the embodiments presented could also be combined with other passive solar elements, as part of a larger energy system.

In addition to being part of a solar energy system other exemplary applications such as use a solar dehydrator/oven, solar crop dryer, and a solar ground heater, where the heated air (or the subsequent heated fluid of interest) is piped underground and released, which would have utility for extending the growing season for crops.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:

1. A progressive air temperature booster within a solar panel comprising:
    a tankless segmented closed loop fluid thermosiphon comprising a heat sink segment capable of absorbing energy from the sun and transmitting it to the fluid within the thermosiphon, a heat exchange segment having a first and a second end, an air intake located at the first end of the heat exchange segment and air outtake located at the second end of the heat exchange segment, a plurality of heat transfer elements located between the air intake and air outtake configured such that the heat transfer elements are progressively warmer as the closer the heat transfer element is to the air outtake; whereby the fluid within the thermosiphon naturally returns to heat sink segment after being cooled by the heat exchange segment.

2. The system of claim 1 wherein the air from the outtake is used to heat an enclosure.

3. The system of claim 2, wherein the air from the enclosure is used as input to the air intake.

4. The system of claim 1 further comprises a secondary heat exchanger configured to extract heat from the air coming from the outtake of the heat exchange segment and transmit it to a fluid of interest.

5. The system of claim 4, wherein the air exiting from the secondary heat exchanger is used to heat an enclosure.

6. The system of claim 5, wherein the air from the enclosure is used as input to the air intake.

7. The system of claim 1, wherein the air entering the air intake is air that has already been utilized to cool photovoltaic solar panels.

8. The system of claim 7, further comprising a temperature controlled air handler that ensures that the air coming from the photovoltaic solar panels and subsequently entering the air intake is maintained at a predetermined temperature.

9. The system of claim 7 wherein the air from the outtake is used to heat an enclosure.

10. The system of claim 9, wherein the air used as input originates from at least one of the enclosure or external to the enclosure.

11. The system of claim 7 further comprises a secondary heat exchanger configured to extract heat from the air coming from the outtake of the heat exchange segment and transmit it to a fluid of interest.

12. The system of claim 11, wherein the air exiting from the secondary heat exchanger is used to heat an enclosure.

13. The system of claim 12, wherein the air from the enclosure is used to cool photovoltaic solar panels.

14. The system of claim 1 wherein the heat change segment is partially covered with photovoltaic solar cells.

15. The system of claim 14 wherein the photovoltaic cells allow non-absorbed solar energy to pass through them and enter the heat exchanger.

16. The system of claim 1, wherein the system provides cooling rather than progressive heating when the temperature of fluid within the thermosiphon is less than that of the temperature of the air entering at the air intake.

17. The system of claim 1, wherein the system acts as a compressorless heat pump when there is sufficient solar energy that the fluid in the closed loop thermosiphon vaporizes in the heat sink segment and condenses in the heat exchange segment.

18. The system of claim 1, wherein the fluid in the closed loop thermosiphon has been at least partially evacuated, by removing gas from closed loop thermosiphon.

19. The system of claim 1 further comprising one or more expansion zones for the fluid within the closed loop thermosiphon.

20. The system of claim 1 further comprising one or more auxiliary temperature boosters connected to the closed loop thermosiphon.

* * * * *